March 26, 1963
D. W. DENNISTON
3,082,614
METHOD AND APPARATUS FOR FORMING FIBERS
Filed Aug. 20, 1959
2 Sheets-Sheet 1
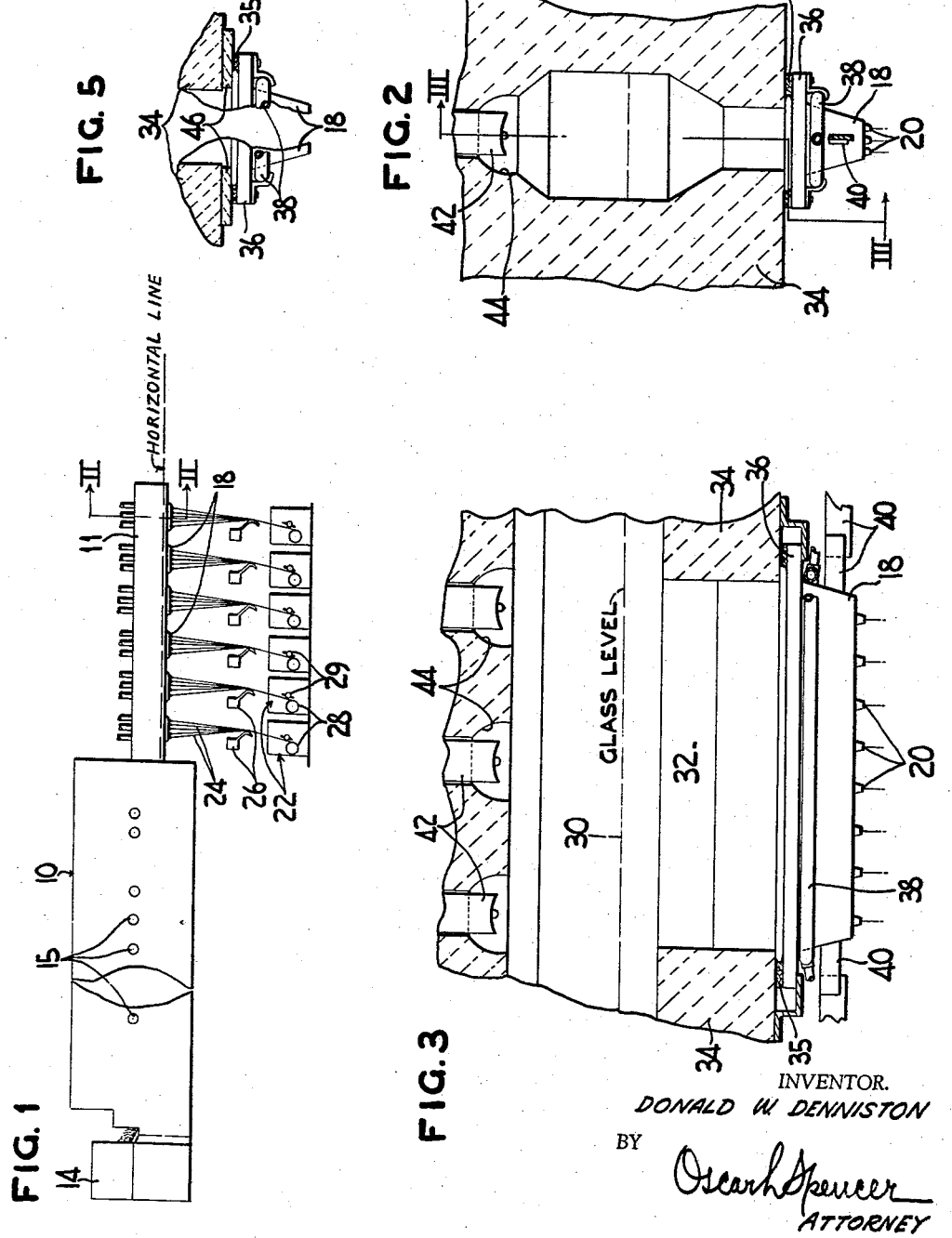
INVENTOR.
DONALD W. DENNISTON
BY
Oscar L Spencer
ATTORNEY

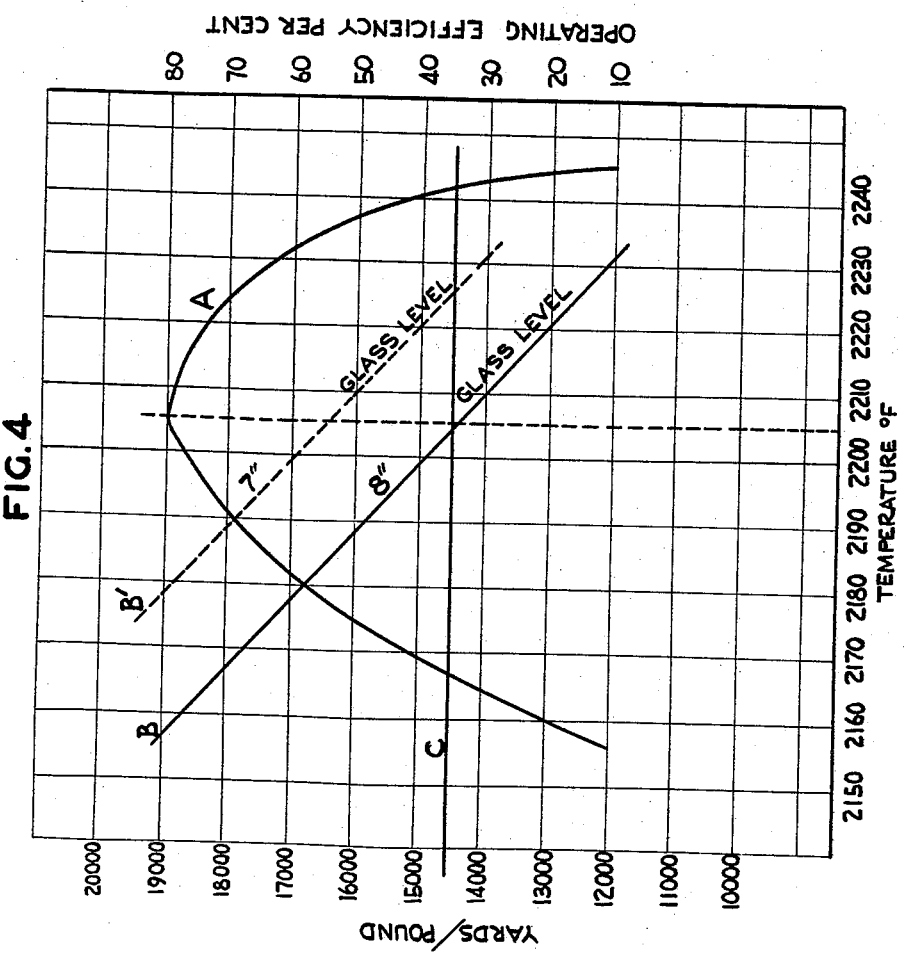

United States Patent Office 3,082,614
Patented Mar. 26, 1963

3,082,614
METHOD AND APPARATUS FOR
FORMING FIBERS
Donald W. Denniston, Ross Township, Pa., assignor to
Pittsburgh Plate Glass Company, Allegheny County,
Pa., a corporation of Pennsylvania
Filed Aug. 20, 1959, Ser. No. 835,077
5 Claims. (Cl. 65—3)

The present invention relates to a method and an apparatus for forming glass fibers, and it has particular relation to apparatus for forming continuous filament textile glass fibers according to the direct melt process.

Continuous filament, textile, glass fibers are for the most part made by two basic processes. Both of these processes employ electrically heated, platinum alloy feeders called bushings having a plurality of orifices in them through which streams of glass flow. These streams are mechanically drawn into fine, continuous, glass filaments which are combined into a strand. One process is termed the marble process, and it makes use of small melting containers with glass marbles being the batch material fed to the melting containers. Each container melts enough glass marbles to supply one bushing with glass. The other method is called the direct melt process. In this process a large tank is employed to form molten glass from batch materials and then supply the molten glass to a plurality of bushings mounted in a forehearth extending from the refining end of the glass tank. An obvious advantage to this latter method is that it eliminates the step of making marbles and then remelting them.

One of the problems encountered in the direct melt process is the difficulty in operating all of the bushings at the same conditions so as to produce the same kind of fiber and strand. Heretofore, commercial production experience has been that each bushing has to be adjusted and readjusted to its own particular operating conditions in order to produce the desired type of yarn. It is therefore an object of the present invention to make continuous filament, textile, glass fibers by the direct continuous melt process in such a manner that all the bushings operate under substantially the same conditions to produce the same type of strand.

The electrical energy supplied to the bushing is regulated so as to operate the bushing at a certain temperature. This provides the glass with a given viscosity as it passes through the orifices in the bushing and permits a filament of the desired diameter to be drawn at a certain speed. One of the factors besides viscosity of the glass which determines the amount of glass passing through the orifices is the height or head of glass above the orifices. The greater the head of glass above the orifices, the greater the amount of glass which passes through the orifices at a given viscosity and drawing speed. Thus, at the same viscosity and drawing speed, different size fibers can be formed depending upon the head of glass above the bushings.

As the glass flows through the forehearth to each successive bushing, the viscous drag of the glass against the refractory side and bottom walls of the forehearth causes the height of glass above each successive bushing along the forehearth to be less. It is another object of the present invention, therefore, to provide apparatus for the direct melt process which permits the glass level above the orifices in each bushing to be the same as the glass travels through the forehearth to each successive bushing.

The difference in glass level from bushing to bushing can be compensated for by designing a different bushing for each position in the forehearth. It is desired, however, to be able to make all the bushings of the same design so that they will be cheaper to make and will be interchangeable in case of need for replacement. The bushings must be replaced from time to time and this reduces the inventory of spare bushings which must be kept as well as making the fabrication easier. This is important where expensive metals such as platinum-rhodium alloys are used to make the bushings.

The manner of accomplishment of these and other objects by the present invention is described in conjunction with the drawings in which:

FIG. 1 is an elevation of apparatus suitable for forming glass fibers according to the continuous melt process;

FIG. 2 is a section on a larger scale along line II—II of FIG. 1;

FIG. 3 is a section along line III—III of FIG. 2;

FIG. 4 is a graph showing operating conditions and efficiencies in the continuous filament glass fiber process; and FIG. 5 is a section of a bushing mounted in a forehearth illustrating another embodiment of the invention.

In FIG. 1 of the drawing there is shown a glass melting tank 10 having a long, narrow forehearth 11 extending from the refining end of the tank. Glass batch suitable for making "E" type glass, a specific example of which is shown in U.S. Patent No. 2,571,074, is introduced into one end of the tank by conventional batch feeding means 14. The invention is equally applicable to the manufacture of fibers from other glasses and "E" type glass is merely illustrative of a glass composition which can be used in the process. The batch is melted in the tank 10 by radiant heat from conventional gas burners 15 to form the glass in molten state, and the molten glass flows by gravity into the forehearth 11. The forehearth as illustrated extends in a straight line, however, the invention contemplates the use of forehearths of other shapes such as, for example, a T-shaped forehearth.

In successive positions along the length of the forehearth, there are mounted a plurality of electrically heated, platinum alloy bushings 18. The glass flows by gravity through orifices 20 in the bushings and is drawn into fine glass filaments by means of winders 22. The individual filaments 24 are grouped together as they pass through a groove in a felt, size applicator 26 and are wound around a rapidly rotating forming tube 28. The strand is traversed back and forth along the length of the forming tube 28 during the winding by a suitable traversing mechanism 29. The speed of travel of the glass fibers is of the order of 5,000 to 20,000 feet per minute and is preferably 12,000 to 15,000 feet per minute. A sizing solution is applied to the felt and in turn transferred to the glass fibers as they pass over the felt pad.

The mounting of the individual bushing in the forehearth is shown in greater detail in FIGS. 2 and 3. The molten glass 30 flows along the forehearth and passes into a well 32 in the forehearth formed by refractory blocks 34. The bushing 18 is mounted at the bottom of the well 32 in very slightly spaced relation to the bottom surfaces of the refractory blocks 34. A gasket 35 made of high temperature, silica or silica alumina fibers helps to form the seal between the bushing and the refractory block. The bushing 18 is made of a platinum-rhodium alloy composed of 90 percent platinum and 10 percent rhodium and is in the form of a trough having flanges 36 extending from the top of the sides all around the trough. Directly under the flanges 36 in heat conducting relation thereto is a tube 38 carrying a cooling fluid which acts to keep the flanges 36 at a relatively low temperature. The seal between the refractory block 34 and the bushing 18 is formed by congealed glass 30 which is kept cool by the fluid in the tube 38.

The bushing 18 is provided with terminals 40 which are connected to a source of current (not shown) to supply electrical energy to the bushing and heat it by means of the electrical resistance of the platinum-rhodium alloy. The bushing heats the glass within the bushing and as it passes through the orifices 20. The glass in the well 32 is further conditioned as to temperature by means of radiant burners 42 which are mounted in openings 44 in the top of the forehearth and which direct radiant energy downwardly into the glass 30 within the well 32.

In a typical operation, the level of the glass 30 above the refractory blocks 34 in the forehearth is about 2 inches at the head or beginning of the forehearth. The distance from the top of the refractory blocks 34 to the bushing orifices is about 6 inches thereby making the total glass height or head above the orifices about 8 inches. This glass level above the bushings should be the same for each bushing to permit the bushings to be operated under the same conditions to make the same kind of yarn.

It has been observed that the level of the glass above the refractory blocks 34 in a 13-foot long, horizontal forehearth having 7 bushings mouned in it varies from 2 inches at the start of the forehearth to approximately 1 inch at the end of the forehearth. This represents a considerable variation in glass level from bushing to bushing and, without compensation in other operating conditions, causes the diameter of the fibers formed from each bushing to be considerably different. Although the difference in level can be compensated for by changing the temperature of the bushing or the winding speed of the forming tube in order to obtain the same diameter fiber from each bushing, this is done at the expense of operating efficiency. For a given glass composition, maximum operating efficiency occurs within a very small temperature range. Thus, it is desired to operate the bushing at a set temperature so that the fiber forming operation is performed at conditions of maximum efficiency.

The graph of FIG. 4 illustrates curves showing operating efficiency and fiber diameter versus bushing temperature for actual operating conditions for a particular glass such as "E" glass. In the graph, the temperature of the glass at the bushing orifice level is plotted as the abscissa and the fiber diameter and operating efficiency are plotted as the ordinates. The fiber diameter is plotted in terms of yards per pound and this is inversely proportional to the source of the fiber diameter. The operating efficiency is determined by calculating the percentage of calldowns per operating start, a calldown being a complete 8 to 12 minute run depending upon the size of strand and package desired.

As the temperature of the glass goes up within the range in which it is fluid, more glass flows through the bushing orifices. However, operating efficiency in the form of continuous fiber forming without inadvertent breakout of the fibers reaches a maximum at a narrow range of temperatures within this range of operating temperatures. It is at this maximum that the fiber forming operation should be carried on and any adjustment to the temperature of the bushing in order to compensate for difference in glass level is made at the expense of operation efficiency. This is further described below.

The flow of glass through a bushing is governed by Poiseuille's law:

$$Q = \frac{R^4 \pi P}{8 L \mu}$$

where $Q$ = flow rate
$R$ = radius of orifice
$P$ = pressure (hydrostatic head of glass)
$L$ = length of bushing tip
$\mu$ = glass viscosity (temperature)

It is desired, of course, to have Q as large as possible to obtain maximum production. The viscosity (and temperature) of the glass is limited to a certain maximum temperature for continuous fiber forming as determined by a certain minimum ratio of viscosity to surface tension for the particular glass. This fixes the temperature for maximum production for a given tip design and glass pressure.

The level of glass above the orifices may be increased to increase the glass flow, but, if all other variables are maintained constant, the drawing speed must be increased in order to make a fiber of the same desired diameter. There is a maximum practical limit to the drawing speed for efficient operation, because of mechanical difficulties encountered at higher r.p.m. of the forming tube and because the increased friction developed in grouping the fibers into a strand and applying the sizing solution to the fibers tends to break the individual filaments and break out the strand. Thus, since there is a maximum practical drawing speed, the glass level for maximum efficiency is fixed.

The glass tank, bushings and winders are built to operate at a predetermined optimum combination of operating conditions. For example, the curves in the drawing represent a typical fiber forming operation for "E" type glass, a given bushing having a tip length of 0.16 inch and an orifice diameter of 0.06 inch and a drawing speed of about 13,000 feet per minute. Curve A shows the operating efficiency versus temperature and it can be seen that the optimum temperature of operation falls at about 2205° F. Curve B represents the entire range of operating conditions (temperature versus yards per pound) for an 8 inch head of glass above the bushing under the conditions establishing curve A. It can be seen that the fiber forming apparatus operates most efficiently when making a strand having 14,500 yards per pound. This is the point where the optimum temperature line intersects curve B.

If the glass level above the bushing is reduced one inch, a new range of operating conditions is established and this is shown by curve B¹. It can be seen that if a strand having 14,500 yards per pound is to be produced at this lower level of glass head, the glass temperature of the bushing must be at about 2225° F. When the bushing is operated at this temperature, the fiber forming process is performed at about a 15 percent decrease in efficiency as shown by curve A. Thus, the importance of maintaining the proper head of glass above each bushing in a forehearth is illustrated with the particular apparatus. Curves similar to B and B¹ may be drawn on the graph of FIG. 4 depending upon differences in bushing tip design and these curves can be determined by Poiseuille's law.

If the level of glass flowing through the forehearth varies from one bushing position to another, some modification in the forehearth and/or bushing mounting in the forehearth must be made to make the glass level above each bushing in the forehearth the same in order to permit the same optimum operating conditions to apply to each bushing. In one embodiment of the invention as shown in FIG. 1, this is accomplished by building the forehearth on a slight slope from the horizontal. In this way the effect of gravity maintains the level of glass above the refractory blocks substantially constant throughout the complete length of the forehearth. For example, in a forehearth approximately 13 feet in length as described above with a two-inch level of glass above the refractory blocks at the beginning of the forehearth and 7 bushing positions, the slope of the forehearth is approximately one inch from one end of the forehearth to the other. These conditions are exemplary only of the invention and it is readily apparent that other dimensions are applicable when the length of forehearth, the number and size of bushing wells, the dimensions of the forehearth chamber, etc. are changed. The slope of the forehearth can be calculated according to the dimensions of the forehearth, the viscosity of the glass as controlled by its temperature along the length of the forehearth and the quantity of glass flowing through the forehearth. It has been found that as the entering glass level is greater, the drop in level is less and vice versa.

According to another embodiment of the invention, the forehearth may be built in a horizontal plane in a conventional manner and each succeeding bushing along the forehearth in the direction of glass flow can be mounted in further spaced relationship from the bottom of the refractory blocks 34. In FIG. 5 there is shown an additional refractory piece 46 which permits the bushing to be mounted slightly lower in a horizontal plane than its preceding bushing. The piece 46 is larger for each bushing position farther away from the beginning of the forehearth. Obviously, a combination of the use of the refractory pieces 46 and the sloping of the forehearth can be made to accomplish the objects of the invention. Other arrangements in forehearth construction and bushing mounting in the forehearth which permit the glass level above the various bushings to be the same are considered to be within the scope of the invention.

The theory of the invention is particularly applicable to the direct melt process of forming continuous filament textile glass fibers, but it is not limited to this process. The invention is applicable to other glass forming processes wherein a forehearth is employed and where it is desired to have the same head of glass at each feeding station in the forehearth. For example, the invention is also applicable to a process for forming fine glass fibers wherein streams of molten glass are fed from a plurality of positions in a forehearth to a plurality of rotary spinners such as shown in U.S. Patent No. 2,609,566. The spinners in turn produce fine fibers which are collected below on a moving foraminous conveyor. In this case, the maintenance of a constant head of glass in the forehearth above the feeders permits all of the feeders and spinners to be operated under the same conditions.

Although the present invntion has been described with respect to specific details of certain embodiments thereof, it is not intended that such details be limitations upon the scope of the invention except insofar as set forth in the accompanying claims.

I claim:

1. Apparatus for forming glass fibers which comprises a glass melting tank, a long, narrow forehearth extending from one end of the tank for continuously delivering a stream of molten glass, a plurality of bushings of the same design mounted in the forehearth in succession along the length of the forehearth for receiving molten glass delivered from the tank by the forehearth and holding a supply of glass therein and means for withdrawing glass in the form of fibers from the bushings, said bushings being mounted so that succeeding bushings in the forehearth are slightly lower than preceding bushings so that the level of the glass supply in each bushing as the glass is fed to and removed from each bushing remains constant and is the same as the level of the glass in each other bushing.

2. An apparatus for making glass fibers which comprises a glass melting tank, a long, narrow forehearth extending from one end of the tank for continuously delivering a stream of molten glass, a plurality of electrically heated metal bushings of the same design mounted in succession in the forehearth for receiving molten glass delivered from the tank by the forehearth and holding a supply of glass therein, means for supplying the same amount of electric current to each of the bushings and means for withdrawing glass from the bushings in the form of fibers, said bushings being mounted so that succeeding bushings in the forehearth are slightly lower than the preceding bushings so that the level of the glass supply in each bushing as the glass is fed to and removed from each bushing remains constant and is the same as the level of the glass in each other bushing.

3. An apparatus for making glass fibers which comprises a glass melting tank, a long, narrow forehearth extending from one end of the tank for continuously delivering a stream of molten glass, the forehearth being composed of refractory top, bottom and side walls, a plurality of bushings of the same design in the bottom wall of the forehearth mounted in succession along the length of the forehearth and means for drawing glass through the bushing to form fibers thereby causing the molten glass to flow continuously from the melting tank through the forehearth and out of the bushings, said bottom wall of the forehearth being sloped slightly downwardly from the horizontal in the direction of flow of the glass so as to overcome the effects of viscous drag of the glass on the side and bottom walls of the forehearth and permit the maintenance of a constant depth of glass throughout the length of the forehearth and above each bushing with the depth of glass in each bushing being the same as the depth in each other bushing.

4. A method of forming glass fibers which comprises
establishing a plurality of spaced molten glass holding and feeding stations arranged in a successive order and in communication with a path of flow of molten glass,
establishing a source of molten glass adjacent an initial glass holding and feeding station,
establishing a flow of molten glass at a predetermined rate of flow from said source along said path of flow, sequentially, to each said holding and feeding station,
said flow of molten glass haivng an uppermost surface positioned in a plane which overlies said spaced holding and feeding stations and which, during flow in a horizontal path of flow, normally slopes downwardly from said source of molten glass toward the lowermost region of said path of flow of molten glass,
drawing glass fibers from a location in the lowermost region of each of said holding and feeding stations, and
adjusting and maintaining equal the distance between each said location from which glass fibers are drawn and the uppermost surface of said flow of molten glass thereabove,
whereby the hydrostatic head of glass is the same at each said location.

5. Apparatus for forming glass fibers which comprises a glass melting tank, a long, narrow forehearth extending from one end of the tank for continuously delivering a stream of molten glass, a plurality of heated bushings of the same design mounted in the forehearth in succession along the length of the forehearth for receiving molten glass delivered from the tank by the forehearth and holding a supply of glass therein, means for withdrawing a plurality of individual glass filaments from each bushing, combining the individual filaments into a strand and winding the strand onto a suitable support, means for heating each bushing to substantially the same temperature and means for operating each drawing means at the same conditions each of said bushings being mounted so that succeeding bushings in the forehearth are slightly lower than preceding bushings so as to maintain the level of the glass supply in each bushing substantially constant and the same as in each other bushing, thereby producing the same diameter strand at each bushing and drawing station.

References Cited in the file of this patent

UNITED STATES PATENTS

| | | |
|---|---|---|
| 1,427,014 | Pazsiczky | Aug. 22, 1922 |
| 2,219,346 | Thomas et al. | Oct. 29, 1940 |
| 2,257,767 | Slayter et al. | Oct. 7, 1941 |
| 2,385,856 | Hayes | Oct. 2, 1945 |

FOREIGN PATENTS

| | | |
|---|---|---|
| 1,181,037 | France | Jan. 5, 1959 |